UNITED STATES PATENT OFFICE.

WILLIAM BURNET, OF NEW YORK, ASSIGNOR OF ONE-HALF TO ALEXANDER OSBURNE, OF BROOKLYN, N. Y.

ARTIFICIAL MARBLE.

SPECIFICATION forming part of Reissued Letters Patent No. 9,705, dated May 17, 1881.

Original No. 161,005, dated March 23, 1875. Application for reissue filed January 20, 1881.

*To all whom it may concern:*

Be it known that I, WILLIAM BURNET, formerly of the city of Chicago, county of Cook, and State of Illinois, but now of the city, county, and State of New York, have invented a new and useful Compound for the Production of Artificial Marble, of which the following is a specification.

My invention consists in the use of a cement called "Keene's cement," or other equivalent cements or plaster made in part or entirely of ground calcined sulphate of lime, combined with potash and alum or a solution of potash-alum. Of these I make a paste, which in its plastic state I can mold into ornaments in relief, busts, statues, flooring of bath-rooms, vestibules, table and stand tops, sepulchral monuments, and which I can use for all purposes for which natural marbles are used. By adding suitable coloring-matter to the composition while in a plastic state I can produce durable and beautiful imitations of every variety of marble at a very small expense. When thoroughly dried it can be polished in the same manner in which natural marbles are polished.

Other cements or plaster the equivalent of Keene's, and which, like it, are capable of being worked into artificial marble, may be used in its stead.

For molding this marble I can use wooden molds coated with varnish or other suitable material.

I never oil my molds, but polish them so highly that the cement or plaster will not adhere to them, but will deliver themselves from the mold by slightly tapping.

I can use china, glass, earthen or stone ware molds, or any kind of metal molds.

What I claim, and desire to secure by Letters Patent, is—

The artificial or manufactured marble described, made from Keene's or other equivalent cements or plaster, composed in part or entirely of sulphate of lime, in combination with potash-alum or potash and alum.

WILLIAM BURNET.

Witnesses:

JAMES R. MURPHY,
JOHN GOGGIN.